United States Patent
Gyure et al.

(10) Patent No.: US 9,632,754 B2
(45) Date of Patent: Apr. 25, 2017

(54) AUTO GENERATION AND LINKAGE OF SOURCE CODE TO TEST CASES

(75) Inventors: Wesley J. Gyure, Wake Forest, NC (US); Matthew G. Marum, Cary, NC (US); David G. Robinson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/542,798

(22) Filed: Jul. 6, 2012

(65) Prior Publication Data

US 2014/0013298 A1 Jan. 9, 2014

(51) Int. Cl.
*G06F 9/45* (2006.01)
*G06F 9/44* (2006.01)
*G06F 11/36* (2006.01)

(52) U.S. Cl.
CPC ............ *G06F 8/30* (2013.01); *G06F 11/3684* (2013.01)

(58) Field of Classification Search
CPC ............................... G06F 8/35; G06F 11/3696
USPC ......................................................... 717/106
See application file for complete search history.

(56) References Cited

U.S. PATENT DOCUMENTS

| | | | |
|---|---|---|---|
| 5,699,310 A | 12/1997 | Garloff et al. | |
| 5,991,529 A * | 11/1999 | Cox | G06F 17/5022 703/13 |
| 6,651,240 B1 | 11/2003 | Yamamoto et al. | |
| 6,876,314 B1 | 4/2005 | Lin | |
| 7,062,755 B2 | 6/2006 | Partamian et al. | |
| 7,219,279 B2 | 5/2007 | Chandra et al. | |
| 7,293,261 B1 * | 11/2007 | Anderson | G06F 8/52 717/104 |
| 7,587,636 B2 | 9/2009 | Tillmann et al. | |
| 7,681,180 B2 | 3/2010 | de Halleux et al. | |
| 2003/0041288 A1 * | 2/2003 | Kolawa | G06F 11/3664 714/38.1 |
| 2004/0078684 A1 * | 4/2004 | Friedman et al. | 714/38 |
| 2006/0010429 A1 | 1/2006 | Ihara | |

(Continued)

OTHER PUBLICATIONS

Bacchelli, A. et al. "On the effectiveness of manual and automatic unit test generation". The Third International Conference on Software Engineering Advances. pp. 252-257. Copyright 2008 IEEE. DOI 10.1109/ICSEA.2008.66.

(Continued)

*Primary Examiner* — Li B Zhen
*Assistant Examiner* — Lenin Paulino
(74) *Attorney, Agent, or Firm* — Matthew F. Mottice; John W. Hayes; William H. Hartwell

(57) ABSTRACT

Aspects of the present invention disclose a system, method and program for automatic generation of source code under test case. In an example, a computer determines whether references to source code under test can be located from a test case. The computer automatically generates boiler plate code required for the creation of source code under test, wherein each section of the source code under test is associated with each section of the test case that caused its generation. The computer analyzes one or more test case syntax clues to provide additional information to form the boiler plate source code under test for the test case. The computer generates source code under test based on the type of boiler plate required for the creation of source code under test and the provided syntax clues in the test case.

15 Claims, 4 Drawing Sheets

(56) References Cited

U.S. PATENT DOCUMENTS

| | | |
|---|---|---|
| 2006/0230320 A1 | 10/2006 | Salvador et al. |
| 2006/0248405 A1 | 11/2006 | Ponczak et al. |
| 2007/0088726 A1* | 4/2007 | Daos ................ G06F 17/30371 |
| 2008/0115116 A1* | 5/2008 | Francis .............. G06F 11/3696 717/135 |
| 2008/0263506 A1* | 10/2008 | Broadfoot ................ G06F 8/10 717/104 |
| 2009/0172647 A1 | 7/2009 | Telang |
| 2010/0077381 A1 | 3/2010 | Allen et al. |
| 2010/0146489 A1 | 6/2010 | Ortiz |
| 2011/0265168 A1* | 10/2011 | Lucovsky ........... H04L 63/0245 726/7 |
| 2011/0307860 A1* | 12/2011 | Park ......................... G06F 8/30 717/107 |
| 2012/0084754 A1* | 4/2012 | Ziegler .............. G06F 11/3696 717/124 |

OTHER PUBLICATIONS

Fix, G. "The Design of an Automated Unit Test Code Generation System". 2009 Sixth International Conference on Information Technology: New Generations. Copyright 2009 IEEE. pp. 743-747. DOI 10.1109/ITNG.2009.95.

"Junit : Message: Re: [junit] Possible to auto-generate test classes (source code frame)?". [online] Retrieved from the internet on: Apr. 25, 2012. URL<http://tech.dir.groups.yahoo.com/group/junit/message/23039>.

"Junit : Message: Re: [junit] Possible to auto-generate test classes (source code frame)?". [online] Retrieved from the internet on: Apr. 25, 2012. URL<http://tech.dir.groups.yahoo.com/group/junit/message/23040>.

\* cited by examiner

*Test Class*

```
package com.ibm.test;
public class TestCase1
{
    public void runTest1()
    {
        @CUT Package:com.ibm
        ClassUnderTest cut = new ClassUnderTest();
            System.out.println(cut.toString());
        try
        {
            String url = "test Url";
            String uid = "username";
            String pwd = "password";
            @CUT Predefine: Response: apache.org.http.Response
            @CUT Expect: Return: return != null
            Response response = cut.sendHttpMessage(url, uid, pwd);
        }
        catch (IOException ioe)
        {
            // do something
        }
    }
}
```

304 — `@CUT Package:com.ibm` / `ClassUnderTest cut = new ClassUnderTest();` / `System.out.println(cut.toString());` / `try`
306 — inner try block
302 — entire TestCase1 class

*Generated Class Under Test*

```
package com.ibm;
import apache.org.http.Response;
public class ClassUnderTest()
{
    // public constructor
    public ClassUnderTest()
    {
        // auto generated
        // TODO: developer
    }
    public Response sendHttpMessage(String url, String uid, String pwd) throws IOException
    {
        Response retVal = null;
        // does something here
        // TODO: developer
        if (retVal == null)
        {
            // error - test class specifies we can't return null
            // TODO: developer
        }
        return   retVal;
    }
}
```

AUTO GENERATION AND LINKAGE OF SOURCE CODE TO TEST CASES

TECHNICAL FIELD

The present invention relates generally to test driven development of software and more specifically to test driven development of software using automated test code generation.

BACKGROUND

Software developers creating new software through the process of writing software code must ensure the software functions properly as intended. In order to ensure the software functions in the manner intended, the written software code must be tested. The software code must pass known parameters by the test case producing expected results rather than breaking code. Breaking code refers to when a test case preformed on a piece of software code produces results different from what is expected. Every piece of software code produced must be tested to ensure the software functions properly. In software code, test cases are typically written for methods or functions. These test cases may be written as the software code is written or the test case may be written first followed by the software code. When writing test cases, the test case may require test environment objects. The test environment objects may be used by the test cases or passed in as parameters.

One of the most commonly used methods for developing software code is the process known as Test Driven Development (TDD) or as Outside In Design (OID). TDD or OID is a process which requires the test case to be written first, rather than the software code that needs to be tested. The TDD process begins by writing a test case for the software code that needs to be tested. Test cases can vary in length, depending on the complexity of the test case; once the test case is written, the test case should fail since the software code the test case is testing has not yet been written. However, in the process of writing the test case, compile errors appear every time a class to be tested is named in the test case. The compile error is presented since the source code under test, which is to be tested, has not been created. Compile errors also arise when a mistake exists in the actual test case software or when the test case project being performed was improperly configured. With every compile error, many Integrated Development Environments provide options where an individual manually selects and resolves the compilation error by selecting some action. This manual selection is seen as a misuse of the error checking technology which is provided by many of the Integrated Development Environments. The misuse stems from the fact that an individual has to click through options for every compile error, which can be very time consuming when writing test cases for software that is extensive in length. Further, this process establishes no linkage between the test case and the source code under test that can be leveraged during the further development and maintenance of the source code under test.

SUMMARY

Aspects of the present invention disclose a method, computer system, and computer program product for the automatic generation of source code under a test case.

Examples include a system, method and program for automatic generation of source code under test case. In an example, a computer determines whether references to source code under test can be located from a test case. In response to at least one reference to source code under test that cannot be located, the computer automatically generates boiler plate code required for the creation of source code under test, wherein each section of the source code under test is associated with each section of the test case that caused its generation. The computer analyzes one or more test case syntax clues to provide additional information to form the boiler plate source code under test for the test case. The computer generates source code under test based on the type of boiler plate required for the creation of source code under test and the provided syntax clues in the test case.

BRIEF DESCRIPTION OF THE SEVERAL VIEWS OF THE DRAWINGS

FIG. 3 is an example of a source code under test generated from a test case in accordance with an embodiment of the present invention.

DETAILED DESCRIPTION

Figure 1:
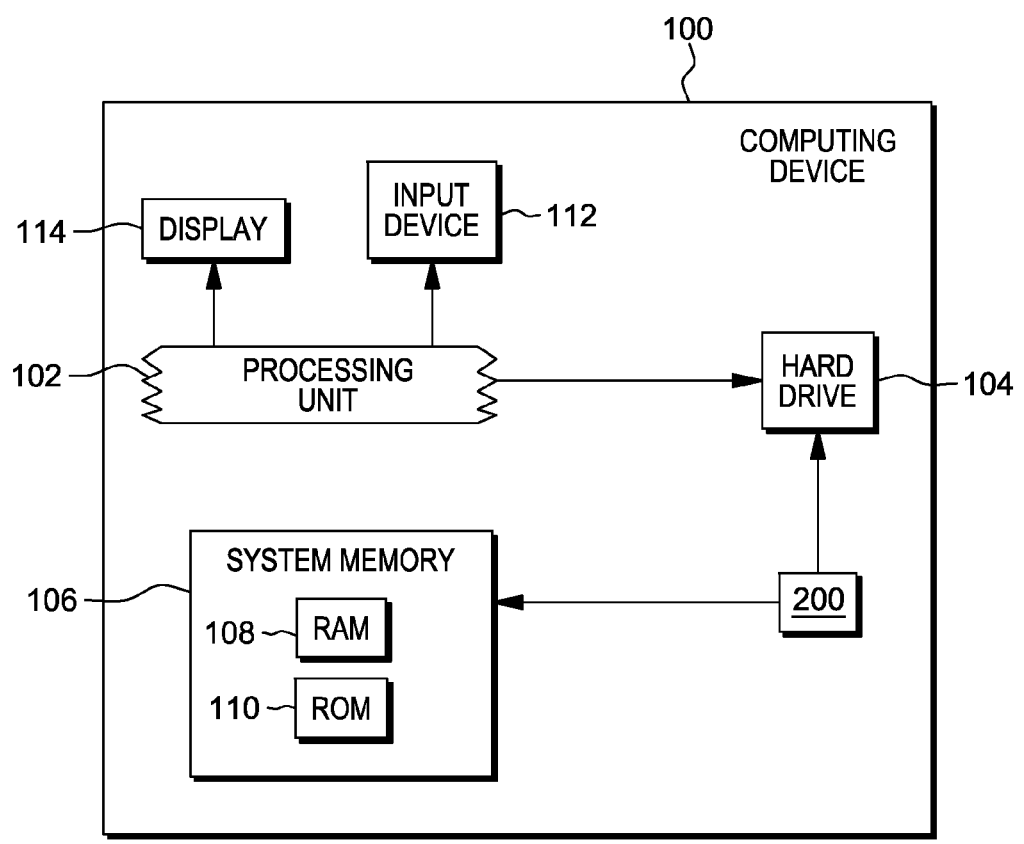
FIG. 1 is a block diagram of hardware and software for an automatic source code generation system in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer-program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram block or blocks.

Embodiments of the present invention will now be described in detail with reference to the accompanying drawings.

FIG. 1 is a functional block diagram of a computing device 100 including a processing unit 102 controlling all operations. Connected to processing unit 102 is a hard drive 104, a system memory 106, consisting of a random access memory (RAM) 108 and a read only memory (ROM) 110, an input device 112 and a display 114. Hard drive 104 stores automatic source code generation program 200 along with all the other operating systems required for computing device 100 to function. System memory 106 consists of RAM 108 and ROM 110, which provide the working memory allowing automatic source code generation program 200 to operate. Automatic source code generation program 200 is controlled through an input device 112 by a user. Display 114 allows the user to control automatic source code generation program 200 through input device 112.

In preferred embodiments of the inventions, computing device 100 may be, but is not limited to: multiprocessor systems, microprocessor-based electronics, minicomputers, mainframe computers, laptops, desktops and tablets. Computing device 100 acts as the median between the user and the automatic source code generation program 200. Computing device 100 must be a programmable electronic device that may store and execute automatic source code generation program 200. Contained within computing device 100, processing unit 102 controls all the operations of computing device 100. Operations from storing to calling automatic source code generation program 200 may be used. Processing unit 102 may be, but is not limited to: single microprocessor, dual micro-processors and other multi-processor architectures. Processing unit 102 translates the user's inputs into computing device 100 and returns the inputs as commands for automatic source code generation program 200 to run. Hard drive 104 provides storage for data, data structures, and computing device 100 executable instructions. Hard drive 104 contains all the data and instructions of automatic source code generation program 200 to operate on computing device 100. Automatic source code generation program may be transferred to the hard drive 104 as a stand alone program or it may be integrated with an existing computer language writing program. Hard drive 104 may only store automatic source code generation program 200 and automatic source code generation program 200 requires a certain amount of system memory 106 to run and execute the pre-programmed functions. In order for automatic source code generation program 200 to operate, system memory 106, of computing device 100, needs to contain RAM 108. RAM 108 is used as a temporary storage area for automatic source code generation program 200 after automatic source code generation program 200 is retrieved from hard drive 104 or ROM 110. In an example, ROM 110 stores automatic source code generation program 200 while waiting for operating commands from processing unit 102 to execute functions. All of the actions that computing device 100 perform are controlled by the user through input device 112. Input device 112 may be, but not limited to: a mouse, a keyboard, a touch screen interface, and wireless remote. Dependent on the type of computing device 100, a certain type of input device may be more ideal for operating automatic source code generation program 200. Computing device 100 consists of display 114 wherein any input by the user may be visually represented when automatic source code generation program 200 executes a function.

Figure 2:
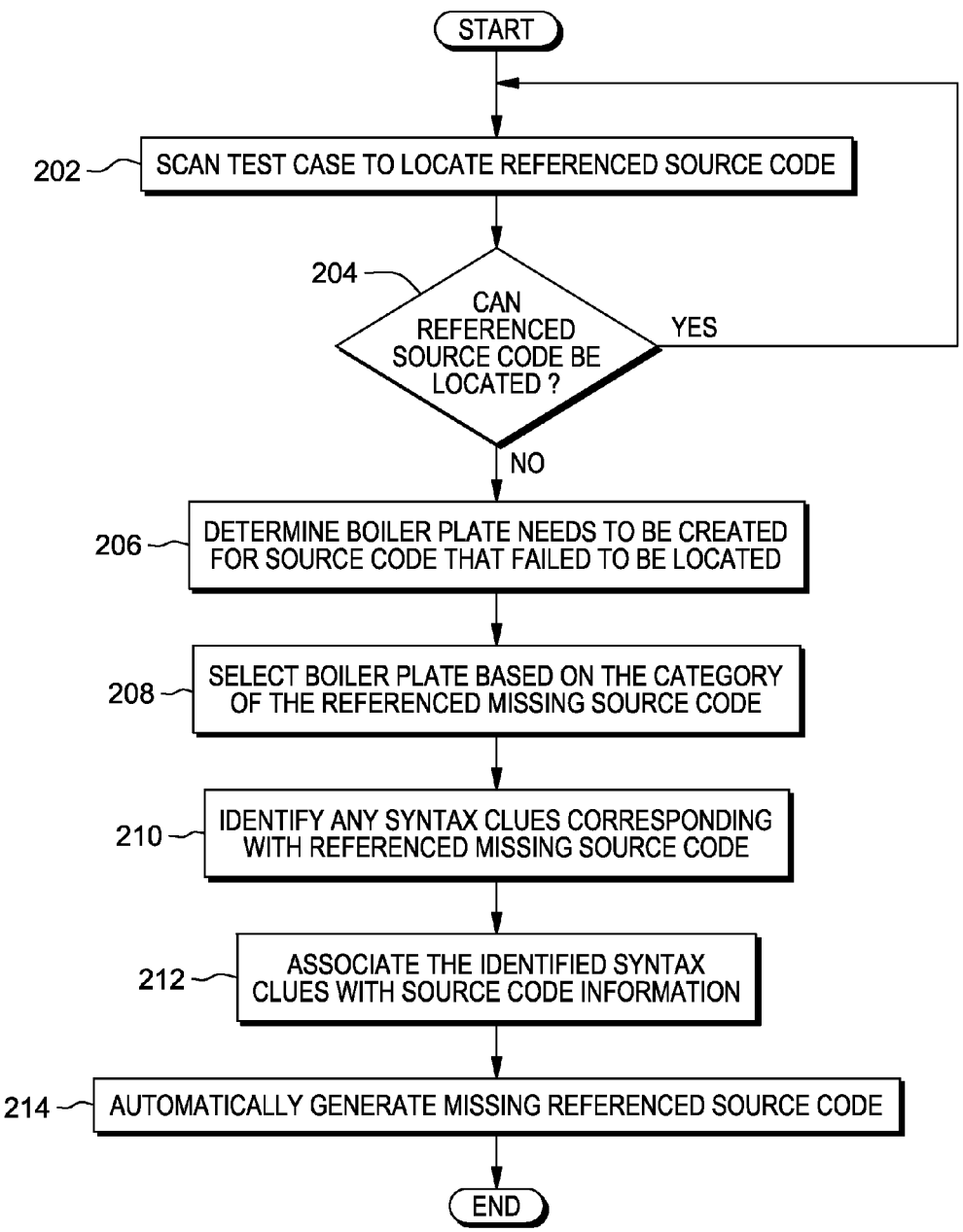
FIG. 2 is a flowchart illustrating the steps of an automatic source code generation system module of FIG. 1 in accordance with an embodiment of the present invention.

FIG. 2 is an embodiment of automatic source code generation program 200 implemented on computing device 100. Automatic source code generation program 200 operates either as a stand alone program called in the test case by a corresponding command line or automatic source code generation program 200 operates as each line of the test case is produce as part of an IDE. In an example, automatic source code generation program 200 operates as part of an IDE in conjunction with C++ as the user is performing a Test Driven Development (TDD) programming process. The user starts TDD programming process by calling the C++ code writing program along with automatic source code generating program 200. Both programs work in conjunction with one another to automatically generate reference source code under test, which could not be located as a test case is being written. While the user inputs the test case using C++ code writing program, automatic source code generation program 200 works in the background. Automatic source code generation program 200 may run in a way not limited to: "Batch-Mode" method and Integrated Development Environment (IDE) method. "Batch-Mode" allows the user to completely write an entire test case before automatic source code generation program 200 performs the task of scanning through the test case identifying whether referenced source code under test could be located. "Batch-Mode" operates with indicated signals, by the user, when a certain test case begins and ends. Another way automatic source code generation program 200 operates is through an IDE. With IDE automatic source code generation program 200 operates as the each line of the test case is being developed by the user. As each line of the test case is being written by the user, the automatic source code generation program 200 scans each complete line of the test case to ensure source code under test being referenced can be located.

In an example, a user with input device 112 begins writing a test case while having automatic source code generation program 200 running in "Batch-Mode". The user manually selects the code writing language which is going to be used to write the test case, as well as the code writing language in which the source code under test automatically generates. Automatic source code generation program 200 has the ability to generate source code under test in a different language from the one being used to create a test case. Such programming languages may be, but is not limited to: C, C++, Java and JScript. In an example, the user writing a test case in C++ program language might want to have the test case be automatically generated in Java programming language. In step 202, the user begins writing the test case and automatic source code generation program 200 scans the test case to locate referenced source code under test in the test case the user is creating. Automatic source code generation program 200 scans every complete phrase as it is written and deciphers each phrase to see if a piece of source code under test is being referenced.

In step 204, upon deciphering each phrase in the test case, the automatic source code generation program 200 determines if the referenced source code can be located. In the instance the referenced source code can be located, automatic source code generation program continues scanning the test case. In the instance referenced source code can not be located; a process to generate the source code is initialized.

In step 206, upon deciphering each phrase in the test case, the automatic source code generation program 200 determines if the referenced source code under test can be located. Automatic source code generation program 200 performs the task by using class and library paths established before the test case was written to locate any potential or binary source codes under test, which allows for the test case to compile. In the instance where the test case has located referenced source code under test, a compile error exists if the connection between the test case and referenced source code under test is not made. In an example, automatic source code generation program 200 connects the test case and the referenced source code test by filling in a marker annotation to compile the test case. The marker annotation ensures, even if the reference source code test can be located, the test case can still compile.

In the instance the referenced source code under test can be located, automatic source code generation program continues scanning the test case. In the instance referenced source code under test can not be located, a process to generate the source code under test is initialized.

Automatic source code generation program 200 has the ability to determine if the test case entered contains typographical errors. Automatic source code generation program 200 searches for compiler information which indicates syntax clues seen in IDE. Based on the information retrieved, automatic source code generation program 200 determines whether a typographical error has been made or if the reference source code under test could not be located. This feature allows for automatic source code generation program 200 to not use the typos to generate a boiler plate code for referenced source code under test which could not be located. For example, if the user creates a test case that repeatedly references an unresolved variable, method name or constant, automatic source code generation program 200 notices such a pattern. Once the certain name being used has an overlooked spelling error, the program automatically reproduces the source code under test and notifies the user that such a typographical error was corrected.

If an error in the code writing happens which does not correlate to a pattern that exists, automatic source code generation program 200 notifies the user of the program that there was a code programming error in the test case and the program does not produce source code under test to resolve the compilation of the test case. In an example, the user creating a test class with references to source code under test which could not be located makes a programming error. Automatic source code generation program 200 identifies such an error and either does not reproduce it when generating the boiler plate which fills in for the missing code or if too many errors exist or unresolved questions exist about whether an artifact in the test case is an error or missing code under test, then the program can refuse to generate a boiler plate class under test and report an error to the user. The user must then manually resolve the error using annotations. Automatic source code generation program 200 proceeds to notify the user of the programming error so it can be corrected and implemented in the boiler plate which was generated.

Since there is referenced source code under test that cannot be located, a boiler plate is substituted in place of the reference source code under test that also could not be located. When writing a test case using code writing language, there are key terms which are associated with different types of source code under test being referenced. For example, if the test case is calling a class to be tested, there is a phrase such as "@CUT" for "class under test". From the phrase "@CUT" automatic source code generation program 200 knows to automatically generate a class boiler in place of where the referenced source code under test could not be located. In step 208, depending on the phrase used in programming the test case, the boiler plate associated with the referenced source code under test which cannot be located is selected based on the category it falls under. Automatic source code generation program 200 then selects the boiler plate to use but does not generate the boiler plate in the section where the missing source code under test is referenced until any additional information can be used to fill in the boiler plate with additional information. Automatic source code generating program 200 searches for the additional information in the form of syntax clues provided in the test case writing language.

Step 210, automatic source code generating program 200 identifies any syntax clues corresponding with the referenced source code under test which could not be located. If the test case references source code under test which can not be located, the subsequent test case information with the references to source code under test which can not be located is evaluated to determine if any syntax clues are present which can be used to fill in the already determined boiler plate. Automatic source code generation program 200 has ability for users to customize their own syntax clues so a given syntax clue can automatically provide information to fill in a boiler plate. In an example, the syntax clues, which are provided by the user in the test case, are imputed by the user according to the programming preferences of the user. The user provides such setting only once and they are then stored in automatic source code generation program 200 which is subsequently stored on hard drive 104 of computing device 100. The syntax clues are in the same programming language, including annotation capabilities, as the test case programming language.

Step 212, automatic source code generation program 200 associates the syntax clues with source code under test information. In an example, the user needs to input parameters into a class which has yet to be created for the test case. Automatic source code generation program 200 scans the test case and generates a boiler plate class under test to satisfy the test case compilation. Once a boiler plate is established, syntax clues provided in the test case to create parameters are implemented into the selected boiler plate. The parameters may be, but not limited to: class names, number of classes, sub-classes and time-constraints. Such parameters add to a boiler plate and make it more comprehensive so when it is automatically generated, there are less corrective measures taken to adjust the source code under test.

Step 214, boiler plate class under test is automatically generated in the location where the reference source code under test could not be located. In an example, once the syntax clue information has been extracted from the test case, automatic source code generation program compiles everything to form the piece of missing source code under test required for the test case to not fail. The user has the ability to set preferences in automatic source code generation program 200 to have the program generate the boiler plate source code under test in any position where the test case may be. The automatic generation of the reference source, which could not be located, is a seamless process from writing the test case to having the source code under test generated.

Automatic source code generation program 200 has the ability to visually associate different parts of the test case being written with different parts of the source code under test that satisfies the test case. In another example, visual association is used to make sure all of the written test case is successfully producing the required source code under test. If automatic source code generating program 200 fails to produce certain corresponding source code under test, the user has a visual representation of where there is no source code under test to go with the objectives of the test case and can manually supply the missing pieces.

FIG. 3 is an example of a theoretical code representing a basic test case with generated source code under test representing the source code under test which could not be located. It illustrates a basic TDD code writing process and how a source code under test would need to be accompanying the written test case. In this example, the theoretical source code under test which could not be located is a class. Initially, the user begins developing code by introducing test case 302, which ensures the code the user wants to develop works properly. In this example, automatic source code generation program 200 runs in "Batch-Mode", scanning the test case after the user completes inputting the test case code. As the user is writing the test case, automatic source code generation program 200 is on standby until a signal is given by the user to perform the scan. Other possibilities for initiating automatic source code generation program 200 include, but are not limited to, manually running the program from a command line prompt. Once test case 302 is scanned, automatic source code program 200 determines referenced source code under test could not be located to satisfy the test case compilation errors. Since the source code under test could not be located, it needs to be created.

Automatic source code generating program 200 initializes the process of automatically generating the source code under test by looking at annotations and compilation errors in the test case 304. For example, automatic source code generation program 200 knows test case 302 is calling a class to be tested because of the "@CUT" phrase referring to the Class-Under-Test which test case 302 is evaluating. Automatic source code generating program 200 establishes a class boiler plate to be used for the ClassUnderTest being referenced in the test case. Once a class boiler plate is established, automatic source code generating program 200 scans to see if any syntax clues are provided to add additional information into the source code under test. In the example, if a method on the class to be tested includes a "String", this acts as a syntax clue signaling additional detail can be added to the class to be tested. The user has the ability to program and input preferences on what certain syntax clues are associated with, to allow the user of automatic source code generation program 200 to have source code generated to their preference. In response to all the syntax clues being identified and all of the information being extracted from the test case, the information is automatically integrated into the source code under test. In another example, the source code under test may be automatically generated in a location or method previously determined by the user of automatic source code generation program 200. The auto-generated class 308 under test case generated represents a class boiler plate along with additional information taken from syntax clues. The auto-generated class 308 is a representation of what is generated with a present ClassUnderTest with an attached set of strings.

Figure 4:
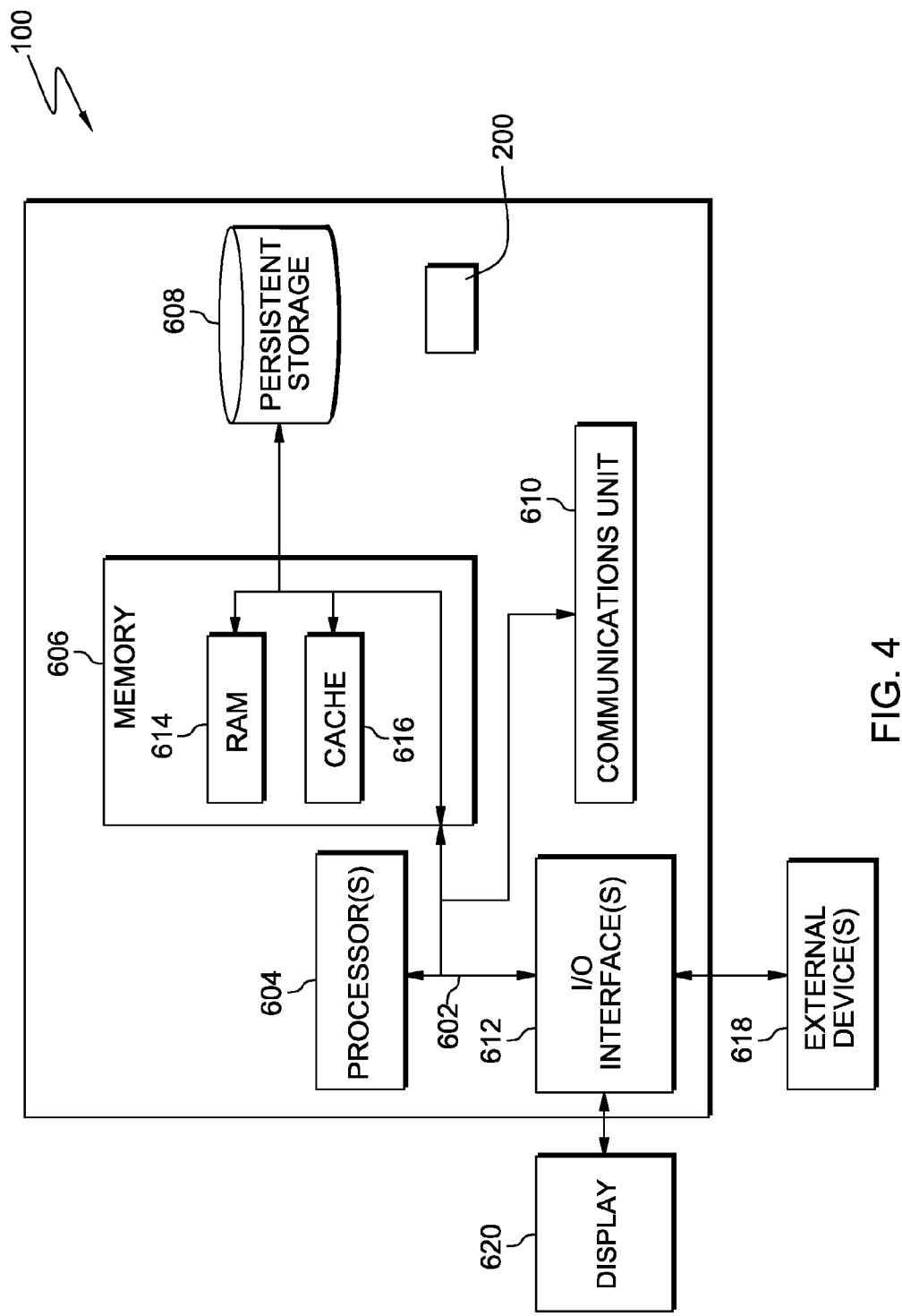
FIG. 4 is a block diagram of hardware and software within the system of FIG. 1.

FIG. 4 depicts a block diagram of components of computing device system 100 in accordance with an illustrative embodiment. It should be appreciated that FIG. 4 provides only an illustration of one implementation and does not imply any limitations with regard to the environment in which different embodiments may be implemented. Many modifications to the depicted environment may be made.

Computing device system 100 includes communications fabric 602, which provides communications between processor(s) 604, memory 606, persistent storage 608, communications unit 610, and input/output (I/O) interface(s) 612.

Memory 606 and persistent storage 608 are examples of computer-readable tangible storage devices. A storage device is any piece of hardware that is capable of storing information, such as, data, program code in functional form, and/or other suitable information on a temporary basis and/or permanent basis. Memory 606 may be, for example, one or more random access memories (RAM) 614, cache memory 616, or any other suitable volatile or non-volatile storage device.

Automatic source code generation program 200 is stored in persistent storage 608 for execution by one or more of the respective processors 604 via one or more memories of memory 606. In the embodiment illustrated in FIG. 3, persistent storage 608 includes flash memory. Alternatively, or in addition to, persistent storage 608 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 608 may also be removable. For example, a removable hard drive may be used for persistent storage 608. Other examples include an optical or magnetic disk that is inserted into a drive for transfer onto another storage device that is also a part of persistent storage 608, or other removable storage devices such as a thumb drive or smart card.

Communications unit 610, in these examples, provides for communications with other data processing systems or devices. In these examples, communications unit 610 includes one or more network interface cards. Communications unit 610 may provide communications through the use of either or both physical and wireless communications links. In another embodiment still, document collaboration system 100 may be devoid of communications unit 610. Automatic source code generation program 200 may be downloaded to persistent storage 608 through communications unit 610.

I/O interface(s) 612 allows for input and output of data with other devices that may be connected to computing device system 100. For example, I/O interface 612 may provide a connection to external devices 618 such as a keyboard, keypad, a touch screen, and/or some other suitable input device. I/O interface(s) may also connect to a display 620.

Display 620 provides a mechanism to display data to a user and may be, for example, a computer monitor.

Based on the foregoing, a method, computer system, and computer program product have been disclosed for automatic source code generation from test cases. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A method for automatic generation of source code under test case comprising:
determining whether references to one or more classes under test can be located from a test case, wherein the test case is in a first high-level code language;
responsive to at least one reference to a class under test that cannot be located, determining whether the class under test that cannot be located is due to a typographical error, wherein a pattern of one or more recurring syntax clues dictates whether the at least one reference to the class under test includes a typographical error;
responsive to determining the class under test that cannot be located is not due to a typographical error, generating boiler plate code in a second high-level code language required for a creation of the class under test in the second high-level code language for the at least one reference to a class under test that cannot be located, wherein functional content of the boiler plate code is different from functional content of the test case such that results generated from the test case are independently different from results generated from the boiler plate code;
analyzing one or more syntax clues in the test case to provide additional information for the generation of the class under test of the generated boiler plate code; and
generating the class under test into the generated boiler plate based on both a type of boiler plate required for the creation of the class under test and the provided syntax clues in the test case, wherein each section of the class under test is associated with each section of the test case that caused its generation;
wherein at least one of the steps is carried out using a computing device.

2. The method of claim 1, wherein the method for automatic generation of the class under test case is integrated with independent code language writing software.

3. The method of claim 1, wherein the analyzing of one or more test case syntax clues is performed through a Batch Mode setting.

4. The method of claim 1, wherein the analyzing step performs a task using an external IDE application.

5. The method of claim 1, further comprising the step of deciphering certain parts of the test case and visual representing any correlation with the class under test.

6. A computer program product for automatic generation of source code under test case comprising:
one or more non-transitory computer-readable tangible storage devices and program instructions stored on at least one of the one or more non-transitory computer-readable tangible storage devices, the program instructions comprising;
program instructions to determine whether references to one or more classes under test can be located from a test case, wherein the test case is in a first high-level code language;
program instructions to, responsive to at least one reference to a class under test that cannot be located, determine whether the class under test that cannot be located is due to a typographical error, wherein a pattern of one or more recurring syntax clues dictates whether the at least one reference to the class under test includes a typographical error;
program instructions to, responsive to determining the class under test that cannot be located is not due to a typographical error, generate boiler plate code in a second high-level code language required for a creation of the class under test in the second high-level code language for the at least one reference to the class under test that cannot be located, wherein functional content of the boiler plate code is different from functional content of the test case such that results generated from the test case are independently different from results generated from the boiler plate code;
program instructions to analyze one or more syntax clues in the test case to provide additional information for the generation of the class under test of the generated boiler plate code; and
program instructions to generate the class under the test case into the generated boiler plate based on both a type of boiler plate required for the creation of the class under test and the provided syntax clues in the test case, wherein each section of the class under test is associated with each section of the test case that caused its generation.

7. The computer program product of claim 6, wherein the computer program product for automatic generation of the class under test case is integrated with independent code language writing software.

8. The computer program product of claim 6, wherein the analyzing of one or more test case syntax clues is performed through a Batch Mode setting.

9. The computer program product of claim 6, wherein the program instructions to analyze performs a task using an external IDE application.

10. The computer program product of claim 6, further comprising program instructions to decipher certain parts of the test case and visually represent any correlation with the class under test.

11. A computer system for automatic generation of source code under test case comprising:
   one or more processors, one or more computer-readable memories and one or more computer-readable storage media, and program instruction, stored on at least one of the one or more storage media for execution by at least one of the one or more processors via at least one of the one or more computer-readable memories, the program instructions comprising:
   program instructions to determine whether references to one or more classes under test can be located from a test case, wherein the test case is in a first high-level code language;
   program instructions to, responsive to at least one reference to a class under test that cannot be located, determine whether the class under test that cannot be located is due to a typographical error, wherein a pattern of one or more recurring syntax clues dictates whether the at least one reference to the class under test includes a typographical error;
   program instructions to, responsive to determining the class under test that cannot be located is not due to a typographical error, generate boiler plate code in a second high-level code language required for a creation of the class under test in the second high-level code language for the at least one reference to the class under test that cannot be located, wherein functional content of the boiler plate code is different from functional content of the test case such that results generated from the test case are independently different from results generated from the boiler plate code;
   program instructions to analyze one or more syntax clues in the test case to provide additional information for the generation of the class under test of the generated boiler plate code; and
   program instructions to generate the class under the test case into the generated boiler plate based on both a type of boiler plate required for the creation of the class under test and the provided syntax clues in the test case, wherein each section of the class under test is associated with each section of the test case that caused its generation.

12. The computer system of claim 11, wherein the program instructions for automatic generation of the class under test case is integrated with independent code language writing software.

13. The computer system of claim 11, wherein the analyzing of one or more test case syntax clues is performed through a Batch Mode setting.

14. The computer system of claim 11, wherein the program instructions to analyze performs a task using an external IDE application.

15. The computer system of claim 11, further comprising program instructions to decipher certain parts of the test case and visually represent any correlation with the class under test.

* * * * *